US010820781B2

United States Patent
Hofmann et al.

(10) Patent No.: US 10,820,781 B2
(45) Date of Patent: Nov. 3, 2020

(54) HEATING ASSEMBLY FOR A WASHING APPLIANCE

(71) Applicant: Haier US Appliance Solutions, Inc., Wilmington, DE (US)

(72) Inventors: Adam Christopher Hofmann, Louisville, KY (US); Ramasamy Thiyagarajan, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 91 days.

(21) Appl. No.: 15/690,404

(22) Filed: Aug. 30, 2017

(65) Prior Publication Data

US 2019/0059694 A1 Feb. 28, 2019

(51) Int. Cl.
*A47L 15/42* (2006.01)
*A47L 15/50* (2006.01)
*A47L 15/23* (2006.01)

(52) U.S. Cl.
CPC ............ *A47L 15/4285* (2013.01); *A47L 15/23* (2013.01); *A47L 15/4221* (2013.01); *A47L 15/4225* (2013.01); *A47L 15/4287* (2013.01); *A47L 15/4293* (2013.01); *A47L 15/502* (2013.01); *A47L 15/507* (2013.01)

(58) Field of Classification Search
CPC ............. A47L 15/0047; A47L 15/4214; A47L 15/4219; A47L 15/4225; A47L 15/4285; A47L 15/4287; A47L 15/4291
See application file for complete search history.

(56) References Cited

U.S. PATENT DOCUMENTS

| 7,604,014 B2 | 10/2009 | Paintner |
| 8,419,865 B2 | 4/2013 | Tarr et al. |
| 9,574,804 B2 | 2/2017 | Dreossi et al. |
| 2011/0290284 A1* | 12/2011 | Chung ............... A47L 15/4206 134/104.2 |
| 2012/0279530 A1* | 11/2012 | Thiyagarajan ......... A47L 15/23 134/174 |
| 2013/0333238 A1 | 12/2013 | Thiyagarajan |

FOREIGN PATENT DOCUMENTS

| EP | 2309052 B1 | 7/2013 |
| KR | 100652481 | 11/2006 |

OTHER PUBLICATIONS

Machine Translation of Jerg et al., EP 2309052, Apr. 2011. (Year: 2011).*

* cited by examiner

*Primary Examiner* — David G Cormier
(74) *Attorney, Agent, or Firm* — Dority & Manning, P.A.

(57) ABSTRACT

A dishwashing appliance includes a first water storage tank, a second water storage tank, and a heat pipe heat exchanger comprising a condenser section and an evaporator section. The evaporator section is in operative communication with the first water storage tank and the condenser section is in operative communication with the second water storage tank.

19 Claims, 4 Drawing Sheets

HEATING ASSEMBLY FOR A WASHING APPLIANCE

FIELD

The present subject matter relates generally to washing appliances, such as dishwashing appliances and, more particularly, to a heating assembly of a washing appliance.

BACKGROUND

Dishwashing appliances generally include a tub that defines a wash chamber. Rack assemblies can be mounted within the wash chamber for receipt of articles for washing where, e.g., detergent, water, and heat, can be applied to remove food or other materials from dishes and other articles being washed. Various cycles may be included as part of the overall cleaning process. For example, a typical, user-selected cleaning option may include a wash cycle and rinse cycle (referred to collectively as a wet cycle), as well as a drying cycle. In addition, spray-arm assemblies within the wash chamber may be used to apply or direct fluid towards the articles disposed within the rack assemblies in order to clean such articles.

Fluids used in the cleaning process may be heated. For example, hot water may be supplied to the dishwasher and/or the dishwasher may include one or more heat sources for heating fluids used in wash or rinse cycle and for providing heat during a drying cycle. It is common to provide dishwashers with rod-type, resistive heating elements in order to supply heat within the wash chamber during one or more of the dishwasher cycles (e.g. during the drying cycle). Generally, these heating elements include an electric resistance-type wire that is encased in a ceramic-filled, metallic sheath. The usage of such electric heaters typically leads to increased energy consumption. Moreover, a significant portion of the energy used to heat the water, e.g., for the wash cycle, may be wasted when the hot water is discharged from the dishwasher after being applied to the articles.

Accordingly, an improved heating device for a dishwashing appliance that provides for improved energy usage would be welcomed in the technology.

BRIEF DESCRIPTION

Aspects and advantages of the technology will be set forth in part in the following description, or may be obvious from the description, or may be learned through practice of the technology.

In one embodiment a dishwashing appliance is provided. The dishwashing appliance includes a first water storage tank, a second water storage tank, and a heat pipe heat exchanger comprising a condenser section and an evaporator section. The evaporator section is in operative communication with the first water storage tank and the condenser section is in operative communication with the second water storage tank.

In another embodiment, a method of operating a dishwashing appliance is provided. The method includes filling a first water storage tank of the dishwashing appliance with hot water, circulating the hot water from the first water storage tank into and through a wash chamber defined within a tub of the dishwashing appliance whereby the hot water entrains soil particles. The method also includes filling a second water storage tank with water after circulating the hot water from the first water storage tank into and through the wash chamber, whereby a heat pipe heat exchanger is activated and transfers heat from the hot water in the first storage tank to the water in the second storage tank via the heat pipe heat exchanger. The method also includes removing the water and entrained soil particles from the first water storage tank after transferring the heat from the water in the first storage tank to the water in the second storage tank via the heat pipe heat exchanger. The method further includes flowing water from the second water storage tank to the first water storage tank and circulating water from the first water storage tank into and through the wash chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
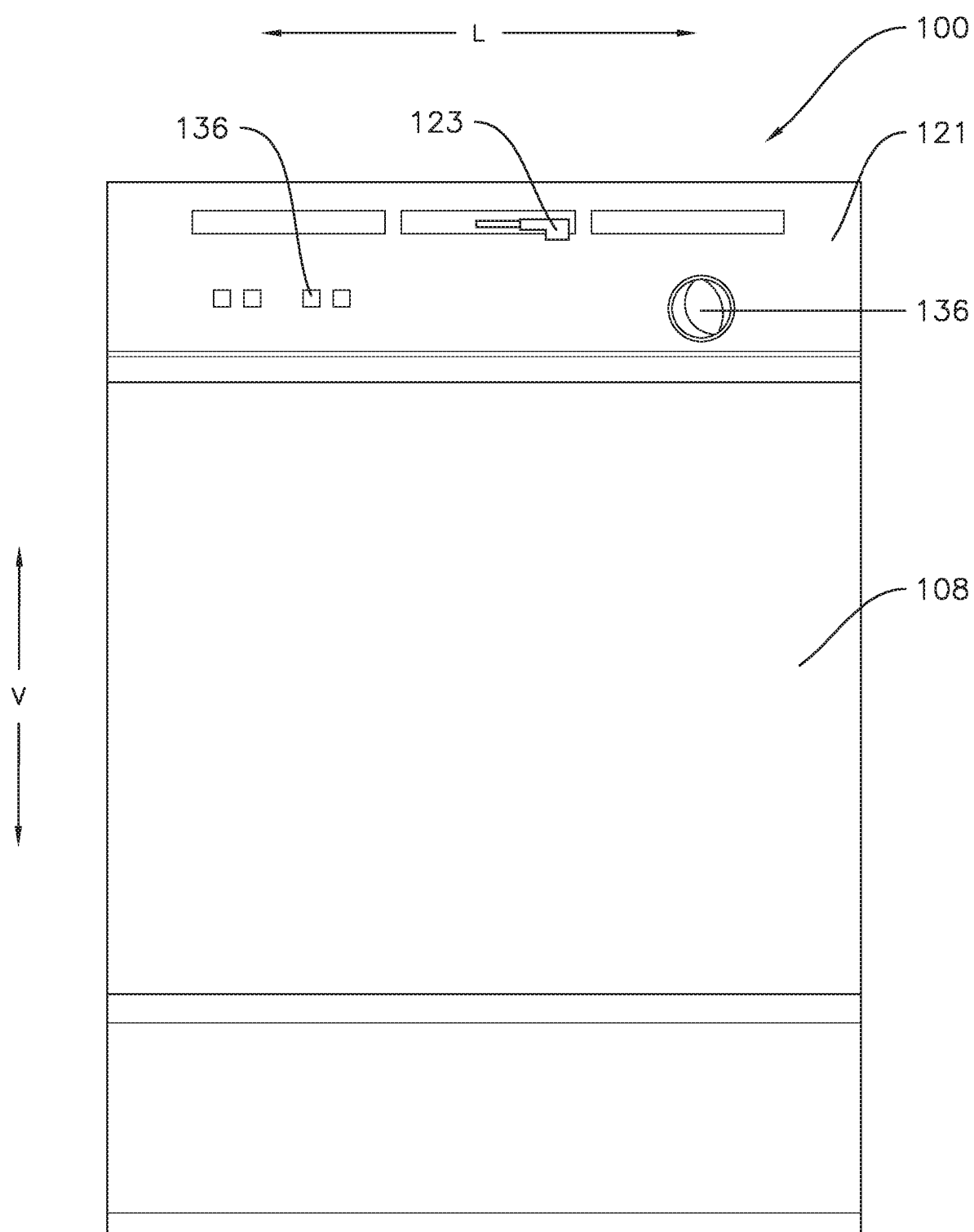
FIG. 1 illustrates a front view of one embodiment of a dishwashing appliance as may incorporate one or more embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 2:
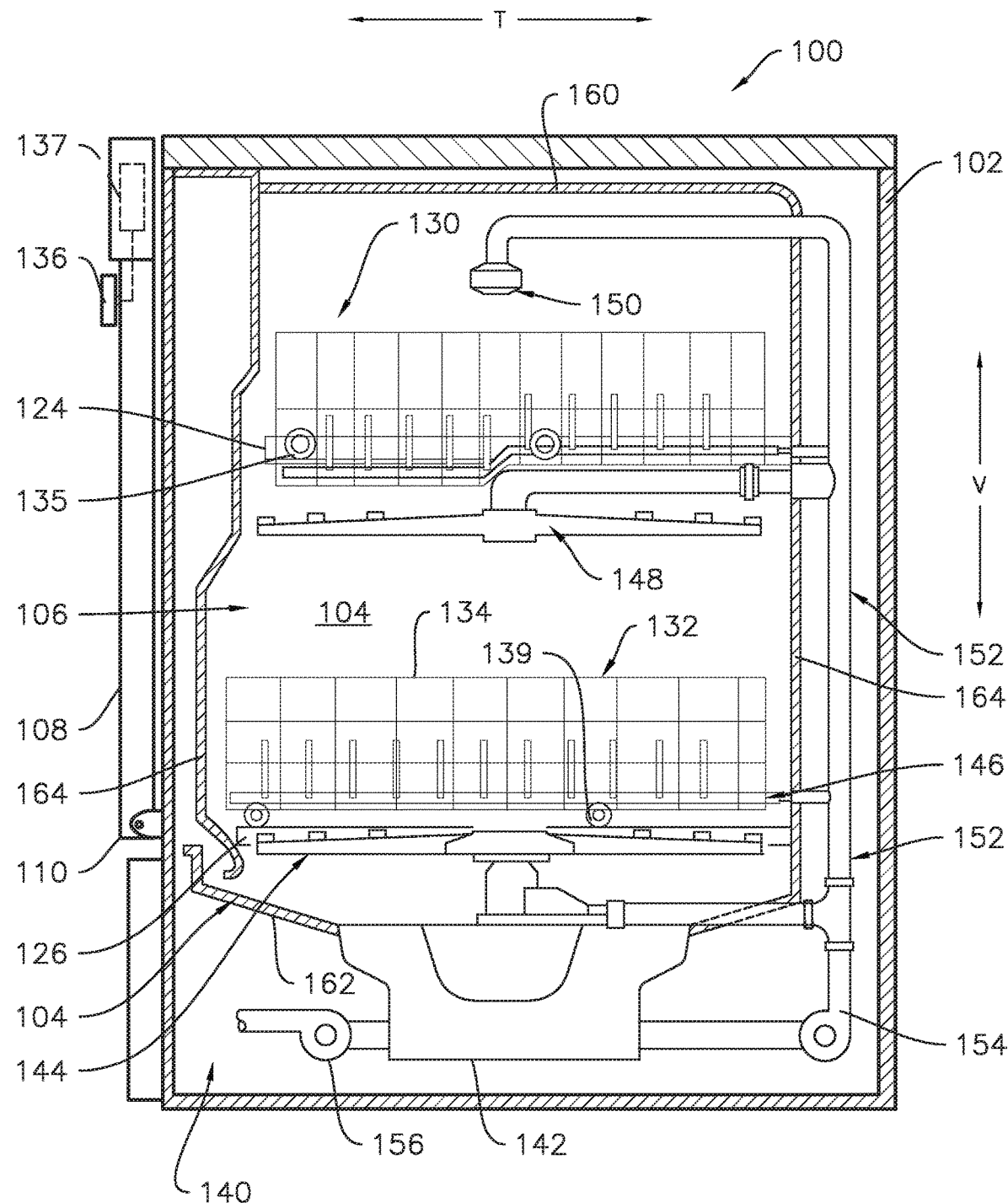
FIG. 2 illustrates a cross-sectional side view of the dishwashing appliance shown in FIG. 1, particularly illustrating various internal components of the dishwashing appliance.

Referring now to the drawings, FIGS. 1 and 2 illustrate one embodiment of a domestic dishwashing appliance 100 that may be configured in accordance with aspects of the present disclosure. As shown in FIGS. 1 and 2, the dishwashing appliance 100 may include a cabinet 102 having a tub 104 therein defining a wash chamber 106. The tub 104 may generally include a front opening (not shown) and a door 108 hinged at its bottom 110 for movement between a normally closed vertical position (shown in FIGS. 1 and 2), wherein the wash chamber 106 is sealed shut for washing operation, and a horizontal open position for loading and unloading of articles from the dishwasher. As shown in FIG. 1, a latch 123 may be used to lock and unlock the door 108 for access to the chamber 106.

As is understood, the tub 104 may generally have a rectangular cross-section defined by various wall panels or walls. For example, as shown in FIG. 2, the tub 104 may include a top wall 160 and a bottom wall 162 spaced apart from one another along a vertical direction V of the dishwashing appliance 100. Additionally, the tub 104 may include a plurality of sidewalls 164 (e.g., four sidewalls) extending between the top and bottom walls 160, 162. It should be appreciated that the tub 104 may generally be formed from any suitable material. However, in several embodiments, the tub 104 may be formed from a ferritic material, such as stainless steel, or a polymeric material.

As particularly shown in FIG. 2, upper and lower guide rails 124, 126 may be mounted on opposing sidewalls 164 of the tub 104 and may be configured to accommodate roller-equipped rack assemblies 130 and 132. Each of the rack assemblies 130, 132 may be fabricated into lattice structures including a plurality of elongated members 134 (for clarity of illustration, not all elongated members making up assemblies 130 and 132 are shown in FIG. 2). Additionally, each rack 130, 132 may be adapted for movement along a transverse direction T between an extended loading position (not shown) in which the rack is substantially positioned outside the wash chamber 106, and a retracted position (shown in FIGS. 1 and 2) in which the rack is located inside the wash chamber 106. This may be facilitated by rollers 135 and 139, for example, mounted onto racks 130 and 132, respectively. As is generally understood, a silverware basket (not shown) may be removably attached to rack assembly 132 for placement of silverware, utensils, and the like, that are otherwise too small to be accommodated by the racks 130, 132.

Additionally, the dishwashing appliance 100 may also include a lower spray-arm assembly 144 that is configured to be rotatably mounted within a lower region 146 of the wash chamber 106 directly above the bottom wall 162 of the tub 104 so as to rotate in relatively close proximity to the rack assembly 132. As shown in FIG. 2, a mid-level spray-arm assembly 148 may be located in an upper region of the wash chamber 106, such as by being located in close proximity to the upper rack 130. Moreover, an upper spray assembly 150 may be located above the upper rack 130.

As is generally understood, the lower and mid-level spray-arm assemblies 144, 148 and the upper spray assembly 150 may generally form part of a fluid circulation system 152 for circulating fluid (e.g., water and dishwasher fluid) within the tub 104. The tub 104 may include a sump 142 positioned at a bottom of the wash chamber 106 for receiving fluid from the wash chamber 106. As shown in FIG. 2, the fluid circulation system 152 may also include a recirculation pump 154 located in a machinery compartment 140 below the bottom wall 162 of the tub 104, as is generally recognized in the art, and one or more fluid conduits for circulating the fluid delivered from the pump 154 to and/or throughout the wash chamber 106. The recirculation pump 154 receives fluid from sump 142 to provide a flow to fluid circulation system 152, which may include a switching valve or diverter (not shown) to select flow to one or more of the lower and mid-level spray-arm assemblies 144, 148 and the upper spray assembly 150.

Moreover, each spray-arm assembly 144, 148 may include an arrangement of discharge ports or orifices for directing washing liquid onto dishes or other articles located in rack assemblies 130 and 132, which may provide a rotational force by virtue of washing fluid flowing through the discharge ports. The resultant rotation of the lower spray-arm assembly 144 provides coverage of dishes and other dishwasher contents with a washing spray.

A drain pump 156 may also be provided in the machinery compartment 140 and in fluid communication with the sump 142. The drain pump 156 may be in fluid communication with an external drain (not shown) to discharge fluid, e.g., used wash liquid, from the sump 142.

The dishwashing appliance 100 may be further equipped with a controller 137 configured to regulate operation of the dishwasher 100. The controller 137 may generally include one or more memory devices and one or more microprocessors, such as one or more general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

The controller 137 may be positioned in a variety of locations throughout dishwashing appliance 100. In the illustrated embodiment, the controller 137 is located within a control panel area 121 of the door 108, as shown in FIG. 1. In such an embodiment, input/output ("I/O") signals may be routed between the control system and various operational components of the dishwashing appliance 100 along wiring harnesses that may be routed through the bottom of the door 108. Typically, the controller 137 includes a user interface panel/controls 136 through which a user may select various operational features and modes and monitor progress of the dishwasher 100. In one embodiment, the user interface 136 may represent a general purpose I/O ("GPIO") device or functional block. Additionally, the user interface 136 may include input components, such as one or more of a variety of electrical, mechanical or electro-mechanical input devices including rotary dials, push buttons, and touch pads. The user interface 136 may also include a display component, such as a digital or analog display device designed to provide operational feedback to a user. As is generally understood, the user interface 136 may be in communication with the controller 137 via one or more signal lines or shared communication busses. It should be noted that controllers 137 as disclosed herein are capable of and may be operable to perform any methods and associated method steps as disclosed herein.

It should be appreciated that the present subject matter is not limited to any particular style, model, or configuration of dishwashing appliance. The exemplary embodiment depicted in FIGS. 1 and 2 is simply provided for illustrative purposes only. For example, different locations may be provided for the user interface 136, different configurations may be provided for the racks 130, 132, and other differences may be applied as well.

Figure 3:
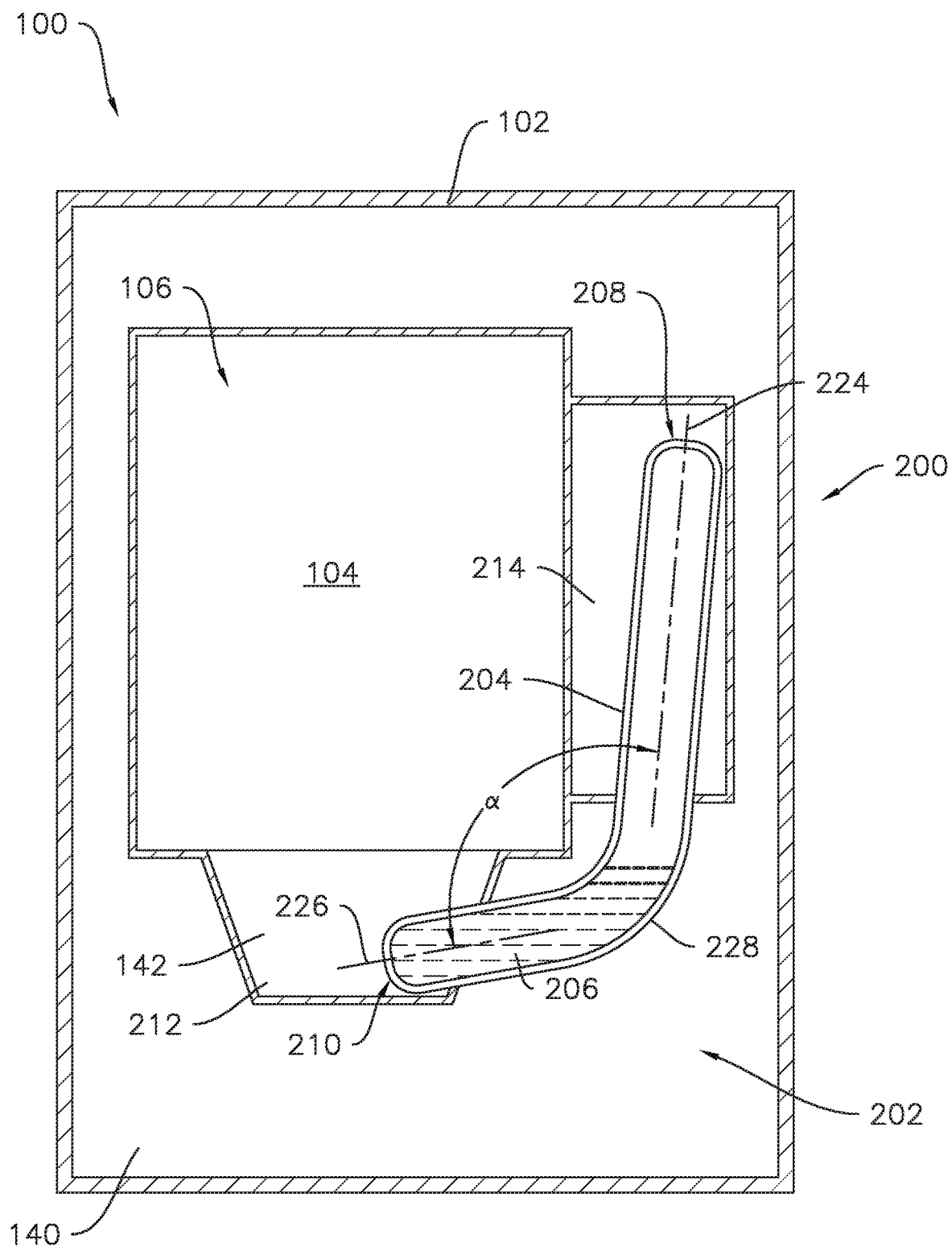
FIG. 3 provides a schematic view of a dishwashing appliance including a heating system according to one or more embodiments of the present subject matter.

Turning now to FIG. 3, an exemplary heating system 200 may be provided, for example in a dishwashing appliance such as the dishwashing appliance 100 illustrated in FIGS. 1 and 2. A heat pipe heat exchanger, hereinafter referred to as a "heat pipe," is an efficient means of transferring thermal energy, e.g., heat, from one location to another. For example, in some embodiments, as illustrated in FIG. 3, the heating system 200 may include heat pipe 202, as described in more detail hereinbelow, which captures heat from a first liquid e.g., water, in a first water storage tank 212 at one end and uses the captured heat for heating a second liquid, e.g., water, in a second water storage tank 214 on the other end. The first liquid may also comprise water, detergent, and/or other additives, which are collectively referred to as wash liquor.

In additional embodiments, the heating system 200 may be provided in other appliances or devices, such as a clothes dryer appliance, desiccator, or any other appliance or device wherein drying is desired.

The heat pipe 202 includes a sealed casing 204 containing a working fluid 206 in the casing 204. In some embodiments, the working fluid 206 may be water. In other embodiments, suitable working fluids for the heat pipe 202 include acetone, methanol, ethanol, or toluene. In other embodiments, any suitable fluid may be used for working fluid 206, e.g., that is compatible with the material of the casing 204 and is suitable for the desired operating temperature range. The heat pipe 202 extends between a condenser section 208 and an evaporator section 210. The working fluid 206 contained within the casing 204 of the heat pipe 202 absorbs thermal energy at the evaporator section 210, whereupon the working fluid 206 travels in a gaseous state from the evaporator section 210 to the condenser section 208. The gaseous working fluid 206 condenses to a liquid state and thereby releases thermal energy at the condenser section 208.

The heat pipe 202 may include an internal wick structure (not shown) to transport liquid working fluid 206 from the condenser section 208 to the evaporator section 210 by capillary flow. In some embodiments, the heat pipe 202 may be constructed and arranged such that the liquid working fluid 206 returns to the evaporator section 210 solely by gravity flow. For example, as illustrated in FIG. 3, the heat pipe 202 may be arranged such that the condenser section 208 is positioned above the evaporator section 210 along the vertical direction V whereby condensed working fluid 206 in a liquid state may flow from the condenser section 208 to the evaporator section 210 by gravity. In such embodiments, where the liquid working fluid 206 may return to the evaporator section 210 by gravity, the wick structure may be omitted.

As shown in FIG. 3, the dishwashing appliance 100 includes sump 142, which is an example embodiment of first water storage tank 212, and second water storage tank 214, which in this example embodiment is positioned on a side of the tub 104, e.g., adjacent to or integral with one of the sidewalls 164. It should be understood that the term "water storage tank" is not intended to be limiting with respect to the use of the tanks, for example, in the embodiments described herein in the context of dishwashing appliance 100, one or both water storage tanks may also store dishwashing detergent or other additives as well as water. Accordingly, discussion herein with respect to "water" which may be stored in the sump 142 and/or second water storage tank 214 should be understood as inclusive of various other matter as will be generally understood in the art, such as entrained soil particles, detergent, etc. The heat pipe 202 generally provides heat transfer from the sump 142 to the second water storage tank 214. The heat pipe 202 may be positioned and arranged such that the evaporator section 210 is in operative communication with the sump 142 and the condenser section 208 is in operative communication with the second water storage tank 214. For example, the evaporator section 210 may be positioned within the sump 142 and the condenser section 208 may be positioned within the second water storage tank 214.

The second water storage tank 214 may be in direct fluid communication with a water supply. For example, the water supply may be the plumbing system of a building such as a residence. In various embodiments the water supply may be a residential, commercial or other water plumbing system. The second water storage tank 214 may in direct fluid communication with the water supply at least with respect to the wash chamber 106 and the fluid circulation system 152. For example, water may flow from the water supply to the second water storage tank 214 through a supply conduit or other passage, so long as the water does not pass through the wash chamber 106 or the fluid circulation system 152, such that the water in the second water storage tank 214 may be considered clean water, the second water storage tank 214 will still be considered as directly connected to the water supply. As will be described in more detail below, water in the sump 142 may be dirty, e.g., may contain soil particles washed off of articles in the wash chamber 102. Thus, the heating system 200 and in particular the heat pipe 202, may generally capture heat from dirty water in the sump 142 and transfer the heat to relatively clean water in the second water storage tank 214. Accordingly, the thermal energy of hot, dirty water in the sump 142 may be conserved by transferring the thermal energy to clean water in the second storage tank 214 before draining the dirty water from the sump 142.

The second water storage tank 214 may receive water in a non-heated, i.e., "cold," state from the water supply. For example, the temperature of the received water may be about room temperature. As will be understood by those of skill in the art, room temperature will vary seasonally, such that when the second water storage tank 214 receives cold water, the cold water may be between about fifty degrees Fahrenheit (50° F.) and about seventy-five degrees Fahrenheit (75° F.). In other instances, the second water storage tank 214 may receive "warm" water, e.g., from a hot water supply of a building downstream of a water heater appliance. The warm water may be between about one hundred degrees Fahrenheit (100° F.) and about one hundred twenty degrees Fahrenheit (120° F.). As used herein, terms of approximation, such as "generally," or "about" include values within ten percent greater or less than the stated value. For example, "about 100° F." includes from 90° F. to 110° F. In embodiments where the first water storage tank 212 is a sump 142 of dishwasher appliance 100, the temperature of the wash liquor stored in the sump 142 may be between about one hundred twenty degrees Fahrenheit (120° F.) to about one hundred sixty degrees Fahrenheit (160° F.), such as about one hundred fifty degrees Fahrenheit (150° F.).

The first water storage tank, e.g., sump 142, and the second water storage tank 214 each define an internal volume or storage capacity. In some embodiments, the volume of the sump 142 and the second water storage tank 214 may be approximately equal. For example, the volume of the sump 142 may be within ten percent greater or less than the volume of the second water storage tank 214. For example, in some embodiments, the sump 142 may comprise an internal volume of about eight tenths of a gallon and the second water storage tank 214 may comprise an internal volume between seventy two hundredths of a gallon and eighty eight hundredths of a gallon. The sump 142 and the second water storage tank 214 may each be in fluid communication with the fluid circulation system 152. For example, the sump 142 and the second water storage tank 214 may be in fluid communication with each other via the fluid circulation system 152. In particular embodiments, the fluid circulation system 152 may be configured to deliver fluid from the second water storage tank 214 to the sump 142. Accordingly, the dishwashing appliance 100 may be operable to flow clean hot water from the second water storage tank 214 to the sump 142 after transferring heat from hot dirty water in the sump 214 to clean water in the second water storage tank 214 and then draining the dirty water from the sump 142. The second water storage tank 214 may be positioned above the sump 142 along the vertical direction V to permit fluid to flow from the second water storage tank 214 to the sump 142 by gravity. In various embodiments, such gravity flow may or may not include the fluid circulation system 152. For example, the second water storage tank 214 may have an opening directly into the wash chamber 106, near the bottom of the chamber 106 and the sump 142, which may permit the second water storage tank 214 to drain into the sump 142 by gravity. In other example embodiments, water may flow from the second water storage tank 214 through one or more conduits which are part of the fluid circulation system 152 by gravity and/or under pressure, e.g., pressure from fluid circulation pump 154.

As illustrated for example in FIG. 3, the heat pipe 202 may include a bend 228 between the condenser section 208 and the evaporator section 210. The bend 228 may define an arcuate shape, as shown in FIG. 3. The bend 228 is preferably not a sharp bend. As illustrated for example in FIG. 3, the condenser section 208 and the evaporator section 210 may be disposed at an angle α. The sharpness of the bend 228 may be defined by or proportional to the angle α. The angle α is supplementary to the bend angle defined by bend 228. The angle α may be the angle subtended by the arcuate bend 228. As shown in FIG. 3, the tub 106 is positioned within the interior of the angle α. The angle α may be greater than ninety degrees. In particular, the condenser section 208 may define a centerline 224, and the evaporator section 210 may define a centerline 226, where the angle α may be defined between the centerlines 224 and 226. The centerline 224 of the condenser section 208 may be within about fifteen degrees of the vertical direction V, such as about ten degrees from the vertical direction V, and/or may form an angle of at least five degrees with respect to the vertical direction V. In particular, the centerline 224 of the condenser section 208 may diverge from the vertical direction V, e.g., as the heat pipe 202 extends away from the bend 228 towards the condenser section 208, the distance between the tub 104 and the heat pipe 202 may increase. Similarly, the centerline 226 of the evaporator section 210 may be within about fifteen degrees of a horizontal direction, e.g., one of the lateral direction L or the transverse direction T, such as about ten degrees from the horizontal direction, and/or may form an angle of at least five degrees with respect to the horizontal direction. In particular, the centerline 226 of the evaporator section 210 may diverge from the horizontal direction, e.g., as the heat pipe 202 extends away from the bend 228 towards the evaporator section 210, the distance between the tub 104 and the heat pipe 202 may increase. In various embodiments, the condenser section 208 may be oriented along the vertical direction V and the evaporator section 210 may be oriented along one of the lateral direction L or the transverse direction T; or, one or both of the condenser section 208 and the evaporator section 210 may diverge from the respective direction as described above. Where the angle α is greater than ninety degrees, the bend 228 is less sharp than if the angle α were ninety degrees or less, which may advantageously provide improved flow between the condenser section 208 and the evaporator section 210. The angle α may be considered an internal angle of the heat pipe 202. The angle α may be the smallest angle defined between the centerline 224 of the condenser section 208 and the centerline 226 of the evaporator section 210. The angle α may be measured between the centerline 224 of the condenser section 208 and the centerline 226 of the evaporator section 210 in a direction that passes through the tub 106.

Where the sump 142 and the second water storage tank 214 are positioned at a bottom of the tub 104 and a side of the tub 104, respectively, the sump 142 and the second water storage tank 214 may be generally orthogonal to one another. The evaporator section 210 may be disposed in the sump 142 and the condenser section 208 may be disposed in the second water storage tank 214. In some embodiments, the evaporator section 210 and the condenser section 208 may be orthogonal to one another. In other embodiments, the evaporator section 210 and the condenser section 208 may be non-orthogonal even though the corresponding water storage tanks are orthogonal. For example, as described above, the angle α may be greater than ninety degrees.

One of skill in the art will recognize that the heat pipe 202 may be activated when the second water storage tank 214 is filled, e.g., with water that is sufficiently lower temperature than water in the sump 142. As the working fluid 206 in the condenser section 208 becomes relatively cool, e.g., by transferring thermal energy to water in the second water storage tank 214, the working fluid 206 will condense and flow in liquid form to the evaporator section 210, e.g., by gravity and/or capillary flow. Thus, as one of ordinary skill would recognize, the heat transfer may be initiated upon filling the second water storage tank 214 and thereby activating the heat pipe 202. Accordingly, at times when transfer of heat from the liquid in the sump 142 is not desired, e.g., during a wash cycle of the dishwasher appliance 100, the heat pipe 202 may be inactive when the second water storage tank 214 is empty, e.g., does not contain liquid in a sufficient amount to draw heat through the heat pipe 202.

Figure 4:
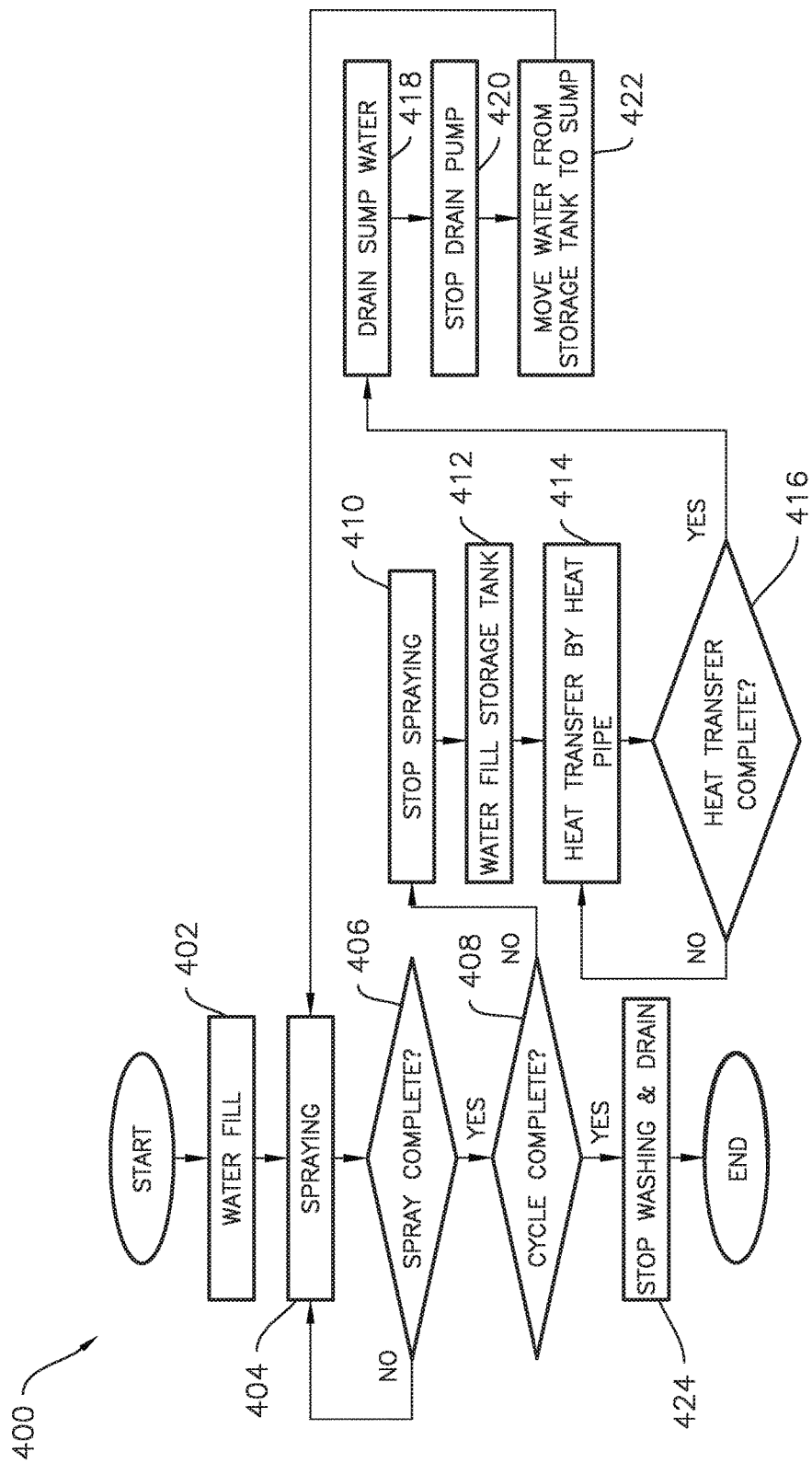
FIG. 4 provides a flow chart of an exemplary method of operating a dishwashing appliance.

FIG. 4 provides a flow chart illustrating an example method 400 of operating a dishwashing appliance 100 according to one or more embodiments. The method 400 includes a step 402 of filling a first water storage tank 212, e.g., sump 142 of the dishwashing appliance 100, with water. Method 400 includes supplying hot water to the sump 142. In various embodiments, supplying hot water to the sump 142 with hot water may include filling the sump 142 with warm water or cold water at step 402 and then heating the water in the sump 142. Supplying hot water to the sump 142 may also include filling the sump 142 with hot water at step 402, e.g., the water may be heated as it passes through a supply system. For example, one or more components of the fluid circulation system 152, such as a conduit, pump, etc., may include an in-line heater in operative communication with the component to heat the water.

The method 400 may further include circulating the hot water from the sump 142 into and through the wash chamber 106 defined within tub 104 of the dishwashing appliance 100 whereby the hot water entrains soil particles. The hot water may be circulated, e.g., by spraying as noted at step 404 in FIG. 4. In such embodiments, the hot water may be sprayed into the wash chamber 106 via one or more of the spray-arm assemblies 144, 148, 150 (FIG. 2). The spraying step 404 may comprise a pre-rinse step, a washing step, or a rinse step. As shown in steps 406 and 408 of FIG. 4, the method 400 may further include determining when the spray operation (e.g., pre-rinse or wash step) is complete and, if so, determining whether the overall cycle is complete. Such determinations 406, 408 may be based on, for example, a cycle setting generated by the controller 137 (FIG. 2) in response to a user input via one or more user interface elements 136 (FIG. 1). The determining steps 406, 408 may also or instead be based on an elapsed time. When the spray operation is complete at step 406 and the overall cycle is complete at step 408, the method 400 may include a step 424 of stopping the wash operations and draining the sump 142.

When the spray operation is complete at step 406 and the overall cycle is not complete at step 408, the method 400 may include a step 410 of stopping spraying and a step 412 of filling the second water storage tank 214. For example, the method 400 may include filling the second water storage tank 214 with water after circulating the hot water from the sump 142 into and through the wash chamber 106. Filling the second water storage tank 214 with water may activate the heat pipe 202, e.g., the heat pipe 202 may be activated and transfer heat from the hot water in the sump 142 to the water in the second storage tank 214 via the heat pipe 202. The method 400 may further include a step 416 of determining the heat transfer from the hot water in the sump 142 to the water in the second storage tank 214 via the heat pipe 202 is complete. For example, determining the heat transfer is complete may include determining a temperature of the water in the sump 142 is within about fifteen degrees Fahrenheit (15° F.) or less of a temperature of the water in the second water storage tank 214, such as within about ten degrees Fahrenheit (10° F.) or less, such as within about five degrees Fahrenheit (5° F.) or less.

The method 400 may include a step 418 of draining the water from the sump 142. Draining the water from the sump 142 may include removing the water and entrained soil particles from the sump 142 after transferring the heat from the water in the sump 142 to the water in the second storage tank 214 via the heat pipe 202. The method 400 may include a step 420 of stopping the drain pump, e.g., when all or a substantial portion of the dirty water in the sump 142 has been removed from the sump 142. The method 400 may also include a step 422 of moving water from the second storage tank 214 to the sump 142. For example, moving water from the second storage tank 214 to the sump 142 may include flowing water from the second water storage tank 214 to the sump 142, e.g., via the fluid circulation system 152 and/or by gravity. The method 400 may then return to step 404, e.g., the method 400 may include circulating water from the sump 142 into and through the wash chamber 106 after filling the sump 142 with hot clean water from the second water storage tank 214. In various embodiments, the initial spraying operation of step 404 may be a pre-rinse or a wash step, and the subsequent iterations of the spraying step 404 may comprise one or more wash step(s) or rinse step(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwashing appliance defining a vertical direction, the dishwashing appliance comprising:
   a first water storage tank;
   a second water storage tank positioned above the first water storage tank along the vertical direction; and
   a heat pipe heat exchanger comprising a sealed casing containing a working fluid therein, a condenser section defined by a first end of the sealed casing, and an evaporator section defined by a second end of the sealed casing opposite the first end, the evaporator section in the first water storage tank, the condenser section in the second water storage tank and in direct contact with a liquid in the second water storage tank,
   wherein the second water storage tank is in fluid communication with the first water storage tank such that the liquid in the second water storage tank flows to the first water storage tank by gravity.

2. The dishwashing appliance of claim 1, further comprising a fluid circulation system configured to deliver the liquid from the second water storage tank to the first water storage tank.

3. The dishwashing appliance of claim 1, further comprising a tub defining a wash chamber and a fluid circulation system configured to deliver the liquid from the second water storage tank to the first water storage tank and from the first water storage tank to the wash chamber.

4. The dishwashing appliance of claim 3, wherein the first water storage tank comprises a sump positioned at a bottom of the wash chamber for receiving the liquid from the wash chamber.

5. The dishwashing appliance of claim 4, further comprising at least one spray-arm assembly positioned within the wash chamber, wherein the fluid circulation system includes a recirculation pump, the recirculation pump operable to deliver the liquid from the sump to the at least one spray-arm assembly.

6. The dishwashing appliance of claim 1, wherein the second water storage tank is in direct fluid communication with a water supply.

7. The dishwashing appliance of claim 1, wherein the condenser section and the evaporator section are disposed at an angle to each other, the angle greater than ninety degrees.

8. The dishwashing appliance of claim 7, wherein the sealed casing extends continuously from the first end to the second end and the sealed casing further comprises a bend between the condenser section and the evaporator section.

9. The dishwashing appliance of claim 8, wherein the bend defines an arcuate shape which subtends the angle defined by and between the first end of the sealed casing and the second end of the sealed casing.

10. The dishwashing appliance of claim 1, wherein the condenser section of the heat pipe heat exchanger is positioned above the evaporator section of the heat pipe heat exchanger along the vertical direction such that condensed working fluid flows from the condenser section to the evaporator section by gravity.

11. The dishwashing appliance of claim 1, wherein the first water storage tank comprises a sump positioned at a bottom of a wash chamber for receiving dirty water from the wash chamber, wherein the second water storage tank is in direct fluid communication with a water supply whereby the second water storage tank receives a flow of clean water from the water supply, and wherein the heat pipe heat exchanger transfers thermal energy from the dirty water in the sump to the clean water in the second water storage tank.

12. The dishwashing appliance of claim 1, wherein the first water storage tank defines a first internal volume and the second water storage tank defines a second internal volume, and wherein the first internal volume and the second internal volume are approximately equal.

13. The dishwashing appliance of claim 12, wherein the first water storage tank comprises a sump positioned at a bottom of a wash chamber for receiving dirty water from the wash chamber into the first internal volume, wherein the second water storage tank is in direct fluid communication with a water supply whereby the second water storage tank receives a flow of clean water from the water supply into the second internal volume, and wherein the heat pipe heat exchanger transfers thermal energy from the dirty water in the first internal volume to the clean water in the second internal volume.

14. A method of operating a dishwashing appliance, the dishwashing appliance defining a vertical direction, the method comprising:

supplying hot water to a first water storage tank of the dishwashing appliance;

circulating the hot water from the first water storage tank into and through a wash chamber defined within a tub of the dishwashing appliance whereby the hot water entrains soil particles;

filling a second water storage tank with water after circulating the hot water from the first water storage tank into and through the wash chamber, whereby a heat pipe heat exchanger comprising a sealed casing containing a working fluid therein is activated and transfers heat from the hot water in the first storage tank to the water in the second storage tank via the heat pipe heat exchanger by the working fluid travelling within the sealed casing from an evaporator section of the heat pipe heat exchanger in the first water storage tank to a condenser section of the heat pipe heat exchanger in the second water storage tank and in direct contact with the water in the second water storage tank, the condenser section defined by a first end of the sealed casing, and the evaporator section defined by a second end of the sealed casing opposite the first end;

removing the water and entrained soil particles from the first water storage tank after transferring the heat from the water in the first storage tank to the water in the second storage tank via the heat pipe heat exchanger;

flowing water from the second water storage tank to the first water storage tank, the second water storage tank positioned above the first water storage tank along the vertical direction whereby the water flows from the second water storage tank to the first water storage tank by gravity; and circulating water from the first water storage tank into and through the wash chamber.

15. The method of claim 14, wherein the first water storage tank comprises a sump and the circulated water returns to the sump via gravity flow.

16. The method of claim 14, wherein supplying the hot water to the first water storage tank of the dishwashing appliance comprises supplying the first water storage tank with water having a temperature of about one hundred fifty degrees Fahrenheit.

17. The method of claim 14, wherein filling the second water storage tank with water comprises filling the second water storage tank with water having a temperature of one hundred twenty degrees Fahrenheit or less.

18. The method of claim 14, further comprising determining the heat transfer from the hot water in the first storage tank to the water in the second storage tank via the heat pipe heat exchanger is complete prior to removing the water and entrained soil particles from the first water storage tank.

19. The method of claim 18, wherein determining the heat transfer is complete comprises determining a temperature of the water in the first water storage tank is within fifteen degrees Fahrenheit of a temperature of the water in the second water storage tank.

* * * * *